(No Model.) 2 Sheets—Sheet 1.

J. YOCOM.
MACHINE FOR HARVESTING BEANS.

No. 416,701. Patented Dec. 3, 1889.

WITNESSES
Geo. O. Gregg.
P. M. Hulbert

INVENTOR
John Yocom
By James Whittemore
Attorney.

(No Model.) 2 Sheets—Sheet 2.
J. YOCOM.
MACHINE FOR HARVESTING BEANS.
No. 416,701. Patented Dec. 3, 1889.
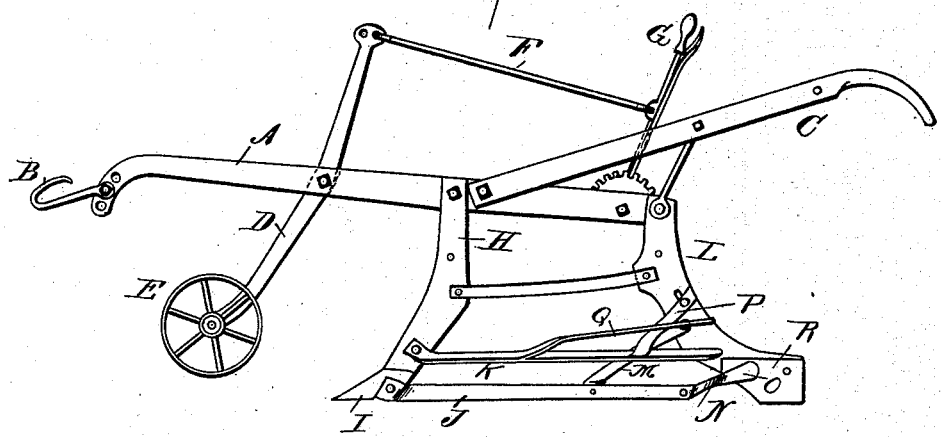
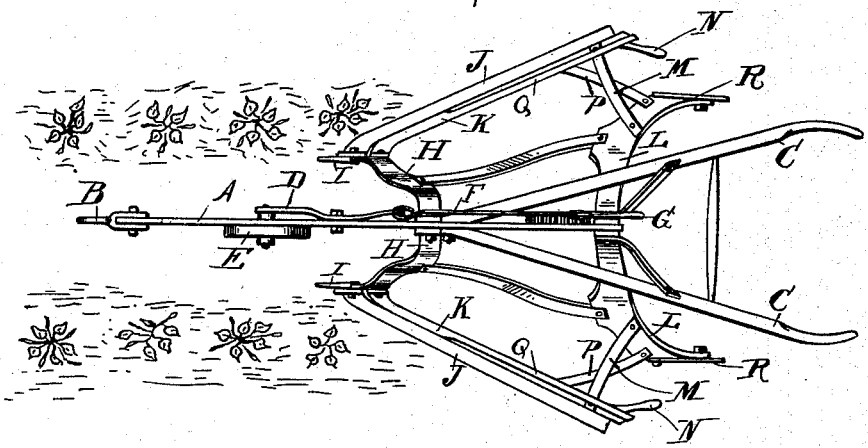
WITNESSES
Geo. C. Gregg
P. M. Hulbert
INVENTOR
John Yocom
By James Whittemore
Attorney.

UNITED STATES PATENT OFFICE.

JOHN YOCOM, OF RIDGETOWN, ONTARIO, CANADA, ASSIGNOR OF ONE-HALF TO ROBERT BOWYER, OF SAME PLACE.

MACHINE FOR HARVESTING BEANS.

SPECIFICATION forming part of Letters Patent No. 416,701, dated December 3, 1889.

Application filed November 30, 1888. Serial No. 292,264. (No model.) Patented in Canada November 9, 1888, No. 30,163.

*To all whom it may concern:*

Be it known that I, JOHN YOCOM, a subject of Her Britannic Majesty Queen Victoria, residing at the town of Ridgetown, in the county of Kent and Province of Ontario, Canada, have invented certain new and useful Improvements in Machines for Harvesting Beans, (for which I have obtained a patent in the Dominion of Canada, No. 30,163, bearing date the 9th day of November, A. D. 1888,) of which the following is a specification.

My invention relates to an improvement in bean-harvesting machines; and it consists in the construction and arrangement of parts, more fully hereinafter described, and definitely pointed out in the claims.

The object of my invention is to provide a machine which will accelerate and simplify the harvesting of beans, at the same time embodying structural simplicity and durability, and which can be cheaply manufactured.

Figure 1:
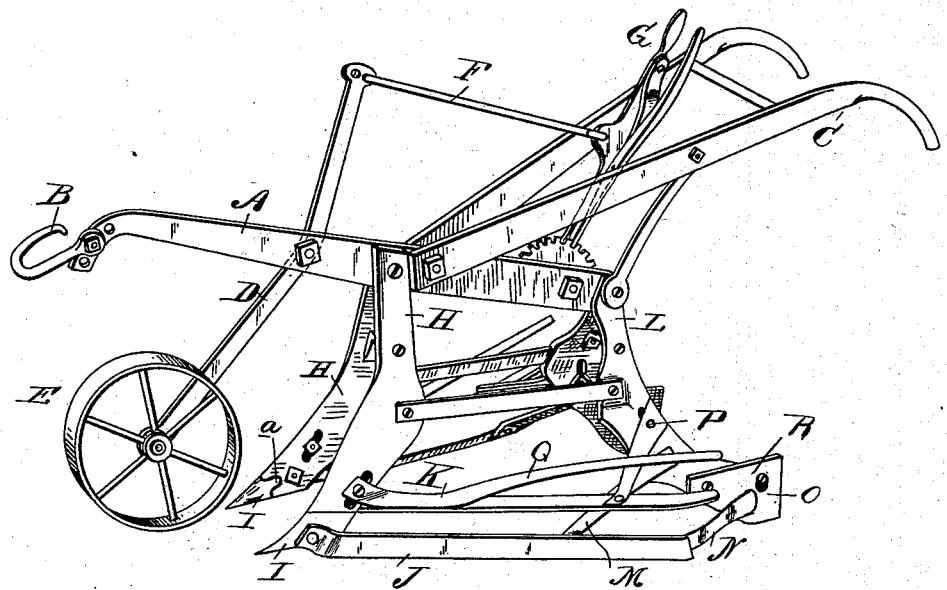
Figure 5:
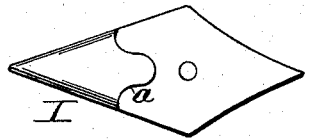
Figure 6:
Figure 4:
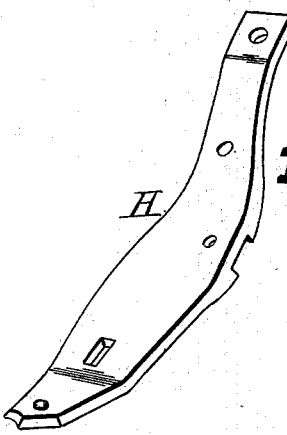

Figure 1 is a perspective view of my machine. Fig. 2 is a side elevation thereof. Fig. 3 is a diagram plan showing the relation of the abutments to the two rows of beans in the operation of the machine. Fig. 4 is a perspective view of one of the forward standards. Fig. 5 is a detached side elevation of the detachable point. Fig. 6 is a plan thereof.

A is the plow-beam, provided at the forward end with suitable draft attachments, such as the hook or clevis B.

C are handles attached to the plow-beam for guiding the plow in operation.

D is a lever pivotally secured to the plow-beam and provided at the downwardly-projecting arm with the ground-wheel E and at its upwardly-projecting arm with the rearwardly-extending link F, to which is connected a hand-lever G, which is in proximity to the driver at the rear end of the plow, and which is provided with any of the usual adjusting devices for adjusting the lever backward or forward for the purpose of raising or lowering the ground-wheel toward or from the ground. It will be observed that the lever D has full play to carry the ground-wheel as far forward as the front end of the beam, or nearly so, and as far backward as to bring it between the front standards, all for the purpose more fully hereinafter described.

H are two standards secured at their upper ends to the plow-beam and projecting slightly forward and outwardly toward their lower ends, terminating at their front ends in a point I. This point I preferably make detachable in the manner shown in Figs. 5 and 6, and secure it to the outside of the standards by bolting it thereto and providing it with a socket or catch $a$, into which the standards engage to more securely hold the point on the standards. Near the lower ends of each of the standards are attached two horizontal abutments J and K, which from their point of attachment with the standards project rearwardly and outwardly. The lower ones of these abutments, which have to cut their way through the ground at a depth of about an inch and a half, are made in the form of knife-bars of steel, with a more or less sharp cutting-edge, and are firmly braced at the rear end from the rear standards L by the braces M. To the heels of these lower abutments are secured the rearwardly-extending lifter-bars N, which extend upwardly and inwardly or parallel with the plow-beam, and are preferably sharpened at their upper edge or provided with a knife-blade.

The upper abutments are parallel, or nearly so, to the lower abutments, being three inches above them in front and four inches above them at the rear, so as to prevent the material from lodging between the two. The rear ends of these abutments are braced by the braces P in the same manner as the lower abutments are by the braces M from the rear standards L, except that the upper abutments are vertically adjustable.

A guide-rail Q is secured above each abutment K and projects about the same distance to the rear and vertically above it.

The rear standards L are spread in the same manner as the front standards, only to a greater width at the lower end, and are rearwardly provided with runners R, preferably formed of steel, adjustably or otherwise secured to the standards, and having the form of steel plates which are adapted to enter into the ground and thereby guide the plow in a lateral direction.

Suitable trussing or braces may be applied between the forward and rearward standards to strengthen the frame of the plow.

In practice the device is drawn by a horse between two rows of beans, and the dimensions of the machine are so calculated that the beans will strike outside of the front standard near the point. There the lower abutment, traveling in the ground to the proper depth, will strike the nub or center of the root portions, and the upper abutment will strike the stalks of the beans, thus forming two abutments for each plant, and as the upper abutment is slightly in the rear of the lower abutment the plant will be slightly forced into a rearwardly-inclined position and carried by the outward inclination of the abutments out of the ground gradually as the machine advances until at the rear end of the abutments they have been thrown entirely clear of the other hills and leave the machine with their roots up out of the ground and their tops outside. The lifter-bar N at the lower end of the abutments raises the roots fully out of the ground and cuts off any straggling or fine roots.

It will be seen that there is not a plow combined with my machine, as the lower abutment is merely constructed to go through the ground in the easiest way possible without increasing the draft, the earth being free to pass over it between the lower and upper abutments.

In addition to the adjustments already described, I intend to provide the machine wherever desired with the necessary or desirable adjustments.

The guard Q above the upper abutment has an important function in preventing any stalks from passing over the top or upper abutment, so that the work of the machine leaves the stalks all in a nice straight row in the rear end of the machine between the rows of hills.

The object of the adjustment of the ground-wheel in the longitudinal direction of the machine is that if it is thrown backward so as to travel between the front standards it will guide the machine more correctly to follow the unevenness of the ground.

What I claim as my invention is—

1. In a machine for harvesting beans, the combination, with the frame and standards, of two pairs of outwardly-spreading abutments secured to the standards, the lifters N, and runners at the rear of the abutments, substantially as described.

2. The combination, in a machine for harvesting beans, of the beam, the front and rear standards secured thereto, the outwardly-spreading abutments secured to the standards, the runners secured to the rear standards, and the adjustable ground-wheel controlled by a lever from the rear end of the machine, substantially as described.

3. In a machine for harvesting beans, the combination of the plow-beam, the front and rear standards secured thereto in pairs on either side of the beam, the outwardly-spreading abutments secured to the lower ends thereof, and the lifter-bars secured to the rear end of the lower abutments, substantially as described.

JOHN YOCOM.

Witnesses:
S. N. YOUNG,
E. H. RIDLEY.